(12) United States Patent
Takahashi

(10) Patent No.: US 7,248,739 B2
(45) Date of Patent: Jul. 24, 2007

(54) SEMICONDUCTOR DEVICE FOR COMPRESSING VIDEO SIGNALS WITH COPY PROTECTION INFORMATION

(75) Inventor: Tetsu Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 411 days.

(21) Appl. No.: 10/102,739

(22) Filed: Mar. 22, 2002

(65) Prior Publication Data

US 2003/0021438 A1 Jan. 30, 2003

(30) Foreign Application Priority Data

Jul. 30, 2001 (JP) .............................. 2001-229330

(51) Int. Cl.
- *G06K 9/36* (2006.01)
- *G06K 9/46* (2006.01)
- *G06K 9/00* (2006.01)
- *H04B 1/66* (2006.01)
- *H04N 7/12* (2006.01)
- *H04N 11/02* (2006.01)
- *H04N 11/04* (2006.01)
- *H04N 7/167* (2006.01)
- *H04N 7/16* (2006.01)
- *G06F 7/04* (2006.01)
- *G06F 17/30* (2006.01)
- *H03M 1/68* (2006.01)
- *H04K 1/00* (2006.01)
- *H04L 9/00* (2006.01)
- *H04L 9/32* (2006.01)

(52) U.S. Cl. ................. 382/232; 375/240.29; 380/203; 726/32

(58) Field of Classification Search ................ 382/166, 382/232, 233; 348/390.1; 358/426.01, 426.12, 358/434, 438; 375/240.01, 240.26, 240.29; 708/203; 380/201–204; 386/94; 705/57; 726/32

See application file for complete search history.

(56) References Cited

U.S. PATENT DOCUMENTS 4,409,670 A * 10/1983 Herndon et al. ............... 701/14

(Continued)

FOREIGN PATENT DOCUMENTS

JP 10210411 A * 8/1998

(Continued)

OTHER PUBLICATIONS

English abstract of the above JP-10210411. (Both submitted as part of the IDS.).*

(Continued)

*Primary Examiner*—Matthew C. Bella
*Assistant Examiner*—Yubin Hung
(74) *Attorney, Agent, or Firm*—Staas & Halsey LLP

(57) ABSTRACT

A semiconductor device capable of deleting data already recorded on a recording medium when information indicative of prohibition of copying is detected from picture signal. Input portion receives an input picture signal, and copy protection information detecting portion detects copy protection information included in the picture signal input from the input portion. Compressing portion compresses the picture signal, and compressed data output portion outputs compressed data obtained by the compressing portion. Specification information output portion generates and outputs specification information specifying a position of the compressed data where the information indicative of prohibition of copying was detected first by the copy protection information detecting portion. A device for recording the compressed data can specify the head of unnecessary compressed information by looking up the specification information, whereby the unnecessary information can be deleted from the recording medium.

7 Claims, 12 Drawing Sheets

U.S. PATENT DOCUMENTS 6,385,386 B1 * 5/2002 Aotake .................. 386/68
6,567,127 B1 * 5/2003 Orr et al. ............... 348/478
6,690,378 B1 * 2/2004 Kohashi et al. ......... 345/532
6,778,757 B1 * 8/2004 Kawamae et al. ....... 386/94

FOREIGN PATENT DOCUMENTS

JP  2000197012  7/2000
JP  2001069336  3/2001

OTHER PUBLICATIONS

Machine achine English translation of JP 10-210411.*
English abstract of the above JP-10210411 (Aug. 1998). (Both submitted as part of the IDS.).*
Machine achine English translation of JP 10-210411 (Aug. 1998).*

* cited by examiner

|  | bitA | bitB |
|---|---|---|
| COPY PERMITTED | 0 | 0 |
| UNDEFINED | 0 | 1 |
| ONE COPY PERMITTED | 1 | 0 |
| COPY NOT PERMITTED | 1 | 1 |

FIG. 6

| DATA | CONTENTS | NO. OF BITS |
|---|---|---|
| 0x10 | COPY RESTRICTION SIGNAL INFORMATION NOTIFICATION COMMAND | 8bit |
| 0x00 | STATE NOTIFICATION CODE | 8bit |
| 0x00~0x03 | STATE OF COPY PROTECTION SIGNAL | 8bit |

FIG. 7

| DATA | CONTENTS | NO. OF BITS |
|---|---|---|
| 0x10 | COPY RESTRICTION SIGNAL INFORMATION NOTIFICATION COMMAND | 8bit |
| 0x01 | POSITION INFORMATION NOTIFICATION CODE | 8bit |
| 0x01~0xFF | BYTE LENGTH OF TARGET POSITION INFORMATION VALUE | 8bit |
| 0x00~ | TARGET POSITION INFORMATION | VARIABLE LENGTH |

FIG. 8

SEMICONDUCTOR DEVICE FOR COMPRESSING VIDEO SIGNALS WITH COPY PROTECTION INFORMATION

BACKGROUND OF THE INVENTION (1) Field of the Invention

The present invention relates to a semiconductor device, and more particularly, to a semiconductor device for compressing picture signal.

(2) Description of the Related Art

In recent years, an increasing number of video recorders which record and reproduce audio and video signals with the use of a DVD (Digital Versatile Disk) or HDD (Hard Disk Drive) are put on the market.

Generally, as an information compression scheme used in recording signals on such recording media, MPEG (Moving Picture Coding Experts Group)-2 Video format is used for video signal, and MPEG1 Layer 1 or 2 or the like is used for audio signal.

To store the signals compressed by such methods on a recording medium, both of AV (Audio and Video) signals, including synchronizing signal, need to be further combined into one and then be multiplexed into data in a format suited for the physical format, protocol, etc. peculiar to DVD or HDD. As such format, MPEG2 PS (Program Stream) or TS (Transport Stream) is generally used.

Recently, one-chip LSIs (Large Scale Integrated Circuits) capable of compressing and multiplexing AV signals have come onto the market. In the present specification, this type of LSI is called MPEG2 encoder.

Meanwhile, with the commercialization of video recorders using DVD or HDD as a recording medium, a need has arisen to protect contents against illegal copying etc., and a technique of inserting a copy protection signal in video signals is used as one of measures to meet the need.

Specifically, a signal indicating "copy permitted", "one copy permitted" or "copy not permitted" is inserted in a VBI (Vertical Blanking Interval) of every field of video signal, and a video recorder looks up such signals to restrict copying.

FIG. 12 illustrates an exemplary configuration of a conventional video decoder using an HDD as a recording medium.

In the figure, an NTSC (National TV Standards Committee) decoder 10 converts a video signal into a digital signal and outputs the converted signal.

A VBI detecting section 11 detects protection information inserted in the VBI of the NTSC signal and notifies a CPU 19 of the information via a bus 22.

An audio A/D (Analog to Digital) converter 12 converts an audio signal into a digital signal.

An MPEG2 encoder 13 compresses the digitized NTSC signal (hereinafter called video data) and the digitized audio signal (hereinafter called audio data) according to MPEG2 format, and outputs the result.

An IDE (Integrated Drive Electronics) I/F (Interface) 14 controls an HDD 15.

Under the control of the IDE I/F 14, the HDD 15 records the data supplied from the MPEG2 encoder 13 into a predetermined region thereof, and also reads out the data recorded in the predetermined region to be supplied to an MPEG2 decoder 16.

The MPEG2 decoder 16 decodes the data compressed according to MPEG2 format, and outputs the video data and the audio data.

A video AMP 17 converts the video data to analog NTSC video signal, and outputs the converted signal.

An audio D/A (Digital to Analog) converter 18 converts the audio data to analog signal and outputs the result.

The CPU (Central Processing Unit) 19 controls the individual parts of the device and performs various operations in accordance with programs stored in a flash ROM (Read Only Memory) 20.

The flash ROM 20 stores programs to be executed by the CPU 19 and various other data.

An SDRAM (Synchronous Dynamic Random Access Memory) 21 temporarily stores programs being executed by the CPU 19 as well as data derived in the middle of operations.

The bus 22 interconnects the VBI detecting section 11, MPEG2 encoder 13, IDE I/F 14, MPEG2 decoder 16, CPU 19, flash ROM 20 and SDRAM 21, and permits exchange of data between these elements.

Operation of the conventional device will be now described.

Video and audio signals are input to the NTSC decoder 10 and the audio A/D converter 12, respectively, whereupon the NTSC decoder 10 converts the video signal to digital signal in compliance with an encode request from the CPU 19 and outputs the converted signal, and the audio A/D converter 12 converts the audio signal to digital signal and outputs the result.

The VBI detecting section 11 detects the protection information inserted in the VBI included in each field of the video data output from the NTSC decoder 10, and supplies the detected information to the CPU 19 via the bus 22. The protection information indicates, for example, "copy permitted" or "one copy permitted" or "copy not permitted", and based on the information the CPU 19 determines whether copying is permitted or not.

On detecting "copy permitted", the CPU 19 instructs the MPEG2 encoder 13 to start encoding. As a result, the MPEG2 encoder 13 compresses the video data supplied from the NTSC decoder 10 and the audio data output from the audio A/D converter 12, according to the MPEG2 scheme, and outputs the obtained data.

The CPU 19 instructs the IDE I/F 14 to store the data output from the MPEG2 encoder 13 in a predetermined region of the HDD 15. Operation like this is continued until the input of video and audio signals ends.

Reproduction of data stored in the HDD 15 will be now described.

The CPU 19 instructs the IDE I/F 14 to reproduce certain data, whereupon the IDE I/F 14 reads out corresponding data stored in a predetermined region of the HDD 15 and supplies the data to the MPEG2 decoder 16 via the bus 22.

The MPEG2 decoder 16 decodes the data supplied from the IDE I/F 14, and supplies the obtained video and audio data to the video AMP 17 and the audio D/A converter 18, respectively.

The video AMP 17 converts the video data supplied from the MPEG2 decoder 16 into analog signal and outputs the result. The audio D/A converter 18 converts the audio data supplied from the MPEG2 decoder 16 into analog signal and outputs the result.

When the information inserted in the VBI is reproduced, the obtained information sometimes includes noise superimposed thereon, and in such cases, the copy protection signal can be erroneously detected.

To prevent such erroneous detection, when an identical signal is detected consecutively a predetermined number of times (e.g., ten times), for example, the detected signal may be judged valid and the specified operation may be executed, whereby the probability of erroneous operation can be lessened.

However, to carry out such control, while the protection information is detected consecutively the predetermined number of times, the MPEG2 encoder 13 needs to be operated to store the generated data in the HDD 15, and when an identical protection signal is detected the predetermined number of times and thus a requested operation is established, the requested operation is executed. Accordingly, even in the case where the requested operation signifies "copy not permitted", data is stored in the HDD 15.

To solve the problem, data that has been stored in the HDD 15 may be deleted afterward. However, once data is compressed by the MPEG2 encoder 13, the correspondence of the compressed data to video data before the compression is not clear. Thus, since it is not clear from which location to which location of data in the HDD 15 should be deleted, it is difficult to delete the compressed data afterward.

SUMMARY OF THE INVENTION

The present invention was created in view of the above circumstances, and an object thereof is to provide a semiconductor device which is robust against noise and which also permits compressed recorded data to be deleted afterward.

To achieve the above object, there is provided a semiconductor device for compressing picture signal. The semiconductor device comprises input portion for receiving an input picture signal, copy protection information detecting portion for detecting copy protection information included in the picture signal input from the input portion, compressing portion for compressing the picture signal, and compressed data output portion for outputting compressed data obtained by the compressing portion.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 6 is a chart illustrating an example of copy protection information inserted in the VBI;

FIG. 7 is a chart illustrating an example of notification data;

FIG. 8 is a chart illustrating an example of specification information;

DESCRIPTION OF THE PREFERRED EMBODIMENTS

Embodiments of the present invention will be hereinafter described with reference to the drawings.

Figure 1:
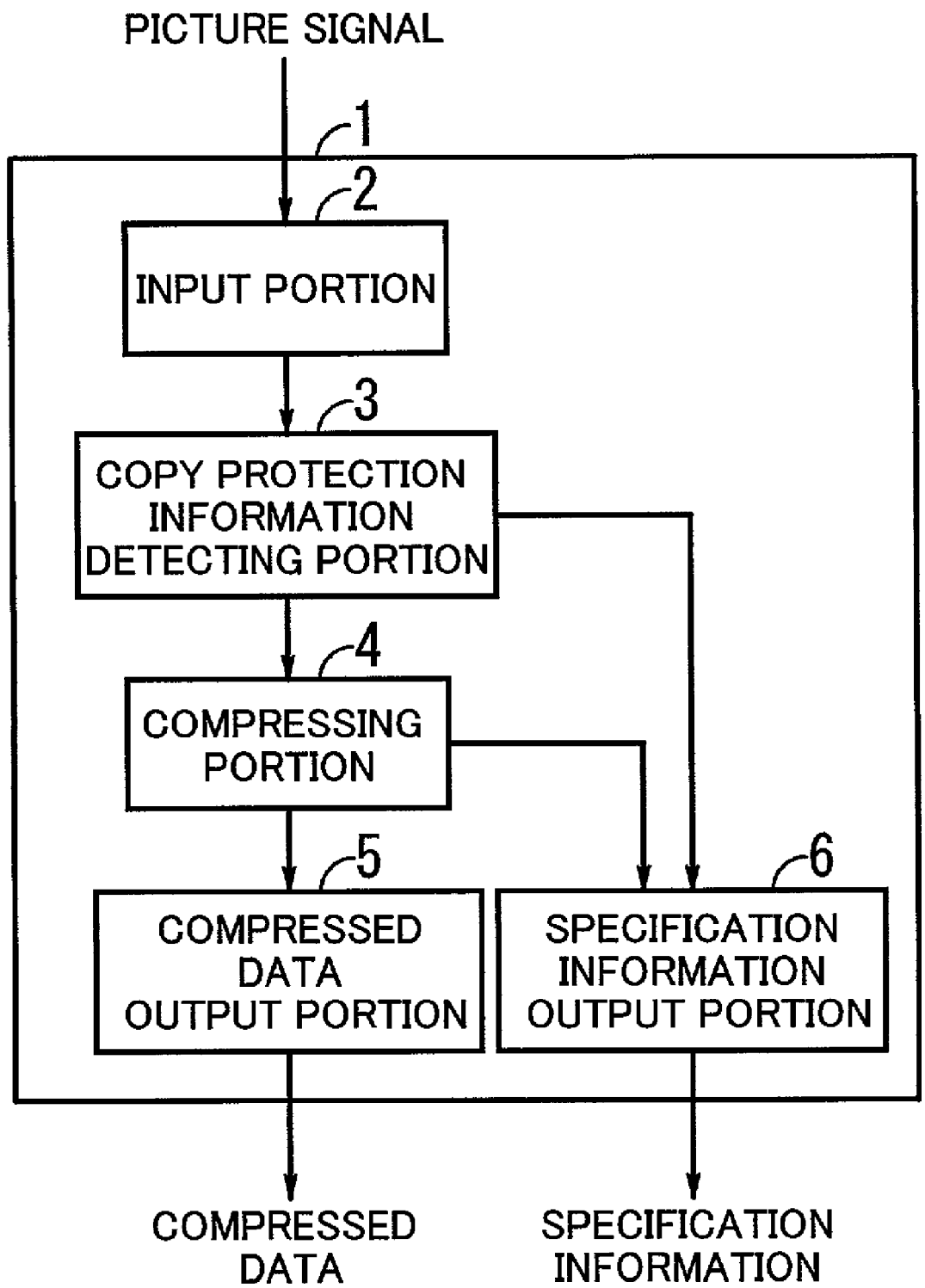
FIG. 1 is a diagram illustrating the principle of operation according to the present invention.

FIG. 1 illustrates the principle of operation according to the present invention. As shown in the figure, a semiconductor device 1 according to the present invention comprises input portion 2, copy protection information detecting portion 3, compressing portion 4, compressed data output portion 5, and specification information output portion 6.

The input portion 2 receives a picture signal input from outside.

The copy protection information detecting portion 3 detects copy protection information included in the picture signal input from the input portion 2.

The compressing portion 4 compresses the picture signal.

The compressed data output portion 5 outputs the compressed data obtained by the compressing portion 4.

When copy protection information is detected by the copy protection information detecting portion 3, the specification information output portion 6 outputs specification information specifying a corresponding part of the compressed data.

Operation in accordance with the illustrated principle will be now described.

When the semiconductor device 1 is supplied with a picture signal from outside, the input portion 2 receives the input picture signal and supplies the signal to the copy protection information detecting portion 3.

The copy protection information detecting portion 3 detects the copy protection information inserted in the input picture signal and supplies the detected information to the specification information output portion 6; it also supplies the picture signal to the compressing portion 4.

The compressing portion 4 subjects the picture signal supplied thereto to an image compression process according to the MPEG2 scheme, for example, and supplies the result to the compressed data output portion 5.

The compressed data output portion 5 outputs picture data obtained through the compression by the compressing portion 4.

If identical copy protection information (e.g., information indicative of prohibition of copying) is consecutively detected a predetermined number of times (e.g., ten times) by the copy protection information detecting portion 3, the specification information output portion 6 outputs specification information specifying a corresponding part of the compressed data output from the compressing portion 4. The specification information to be used may, for example, be the number of bytes as counted from the head of the compressed data with respect to which the copy protection information was detected first (first time).

Thus, the copy protection information is detected within the semiconductor device 1, whereby copy protection can be prevented from being broken through easily by modifying the output signal from the copy protection information detecting portion 3.

Also, when identical copy protection information has been detected the predetermined number of times by the copy protection information detecting portion 3, the specification information output portion 6 outputs specification information specifying the corresponding part of the compressed data. Accordingly, where the compressed data output from the semiconductor device 1 is recorded on a recording medium, for example, it is possible to specify and delete an unnecessary part from among the data already recorded.

Namely, the part with respect to which the copy protection information was detected first can be specified by the specification information, thus making it possible to specify and delete a part of data which is prohibited from being copied and which is already recorded on the recording medium, for example.

An embodiment of the present invention will be now described.

Figure 2:
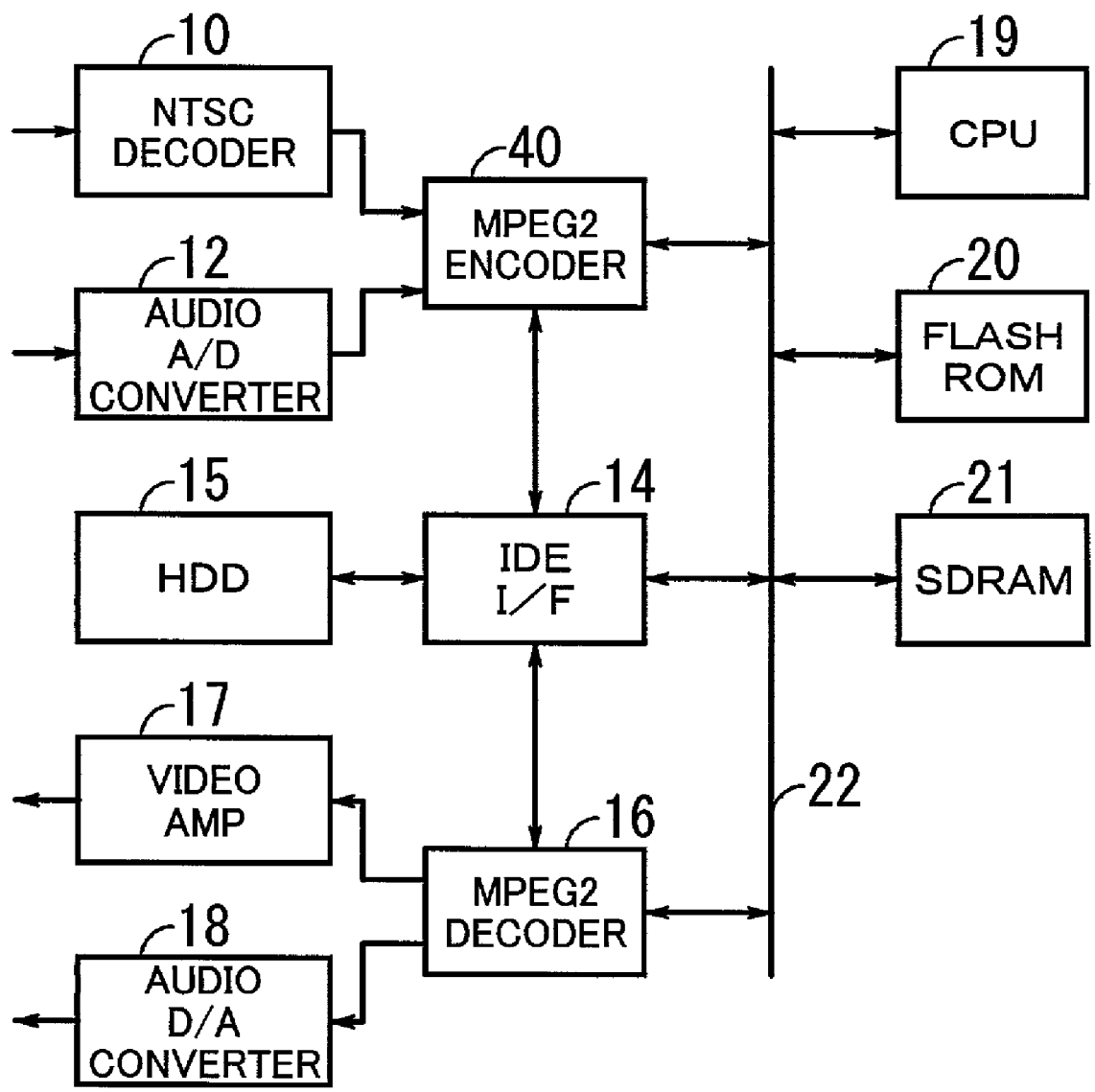
FIG. 2 is a diagram showing an exemplary configuration according to an embodiment of the present invention.
Figure 12:
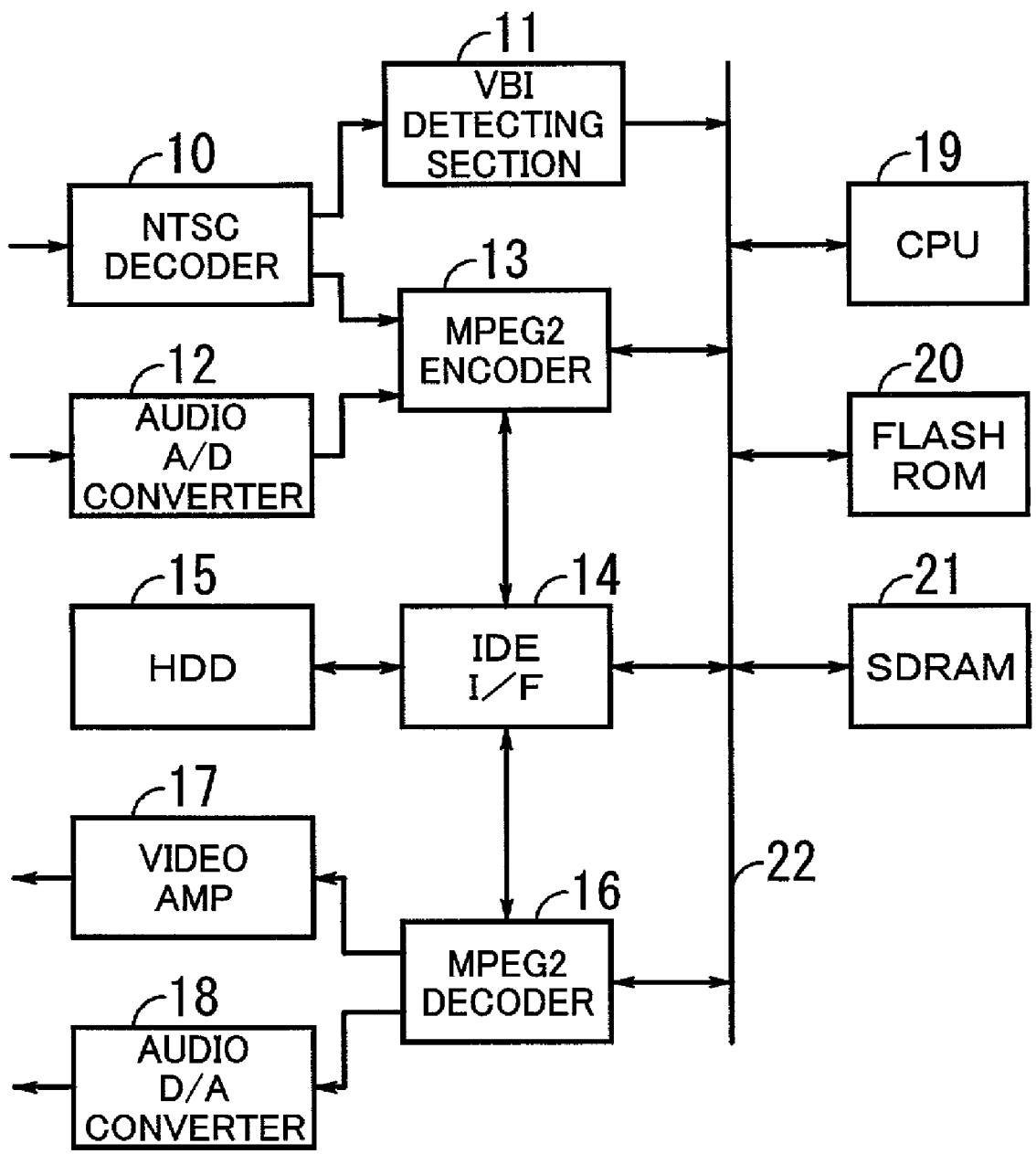
FIG. 12 is a diagram showing an exemplary configuration of a conventional video decoder using an HDD as a recording medium.

FIG. 2 shows an exemplary configuration according to the embodiment of the present invention. As shown in the figure, a recorder including a semiconductor device (MPEG2 encoder 40) according to the present invention comprises an NTSC decoder 10, an audio A/D converter 12, an IDE I/F 14, an HDD 15, an MPEG2 decoder 16, a video AMP 17, an audio D/A converter 18, a CPU 19, a flash ROM 20, an SDRAM 21, a bus 22, and an MPEG2 encoder 40. In this embodiment, as compared with FIG. 12, the VBI detecting section 11 is omitted and the MPEG2 encoder 13 is replaced by the MPEG2 encoder 40.

The NTSC decoder 10 converts an NTSC standard-based video signal into digital signal complying with the ITU-R656 standard, and outputs the converted signal.

The audio A/D converter 12 converts an input audio signal into a digital signal of I2S format.

The MPEG2 encoder 40 encodes the video data supplied from the NTSC decoder 10 into MPEG2 Video MP@ML format, and also encodes the audio data supplied from the audio A/D converter 12 into MPEG1 Audio Layer 2 format. Further, these two types of encoded data are subjected to system multiplexing into MPEG2 PS format, and the resulting data is output as an 8-bit parallel data stream.

The IDE I/F 14, which is an interface for the HDD 15, controls the HDD 15 to write and read data into and from a predetermined region thereof.

The HDD 15 operates under the control of the IDE I/F 14, to record the data supplied from the MPEG2 encoder 40 in a predetermined region thereof and also to read out the data recorded in the predetermined region to be supplied to the MPEG2 decoder 16.

The MPEG2 decoder 16 decodes a data stream that was compressed in the MPEG2 format, and converts the resulting data into video data of ITU-R656 format and audio data of I2S format, which are then output.

The video AMP 17 converts the video data of ITU-R656 format into an analog signal of NTSC format, and outputs the converted signal.

The audio D/A converter 18 converts the audio data of I2S format into analog signal and outputs the result.

The CPU 19 controls the individual parts of the recorder and also performs various operations in accordance with programs stored in the flash ROM 20.

The flash ROM 20 stores programs to be executed by the CPU 19 and various other data.

The SDRAM 21 temporarily stores programs being executed by the CPU 19 as well as data derived in the middle of operations.

The bus 22 interconnects the IDE I/F 14, MPEG2 decoder 16, CPU 19, flash ROM 20, SDRAM 21 and MPEG2 encoder 40 to permit exchange of data between these elements.

Figure 3:
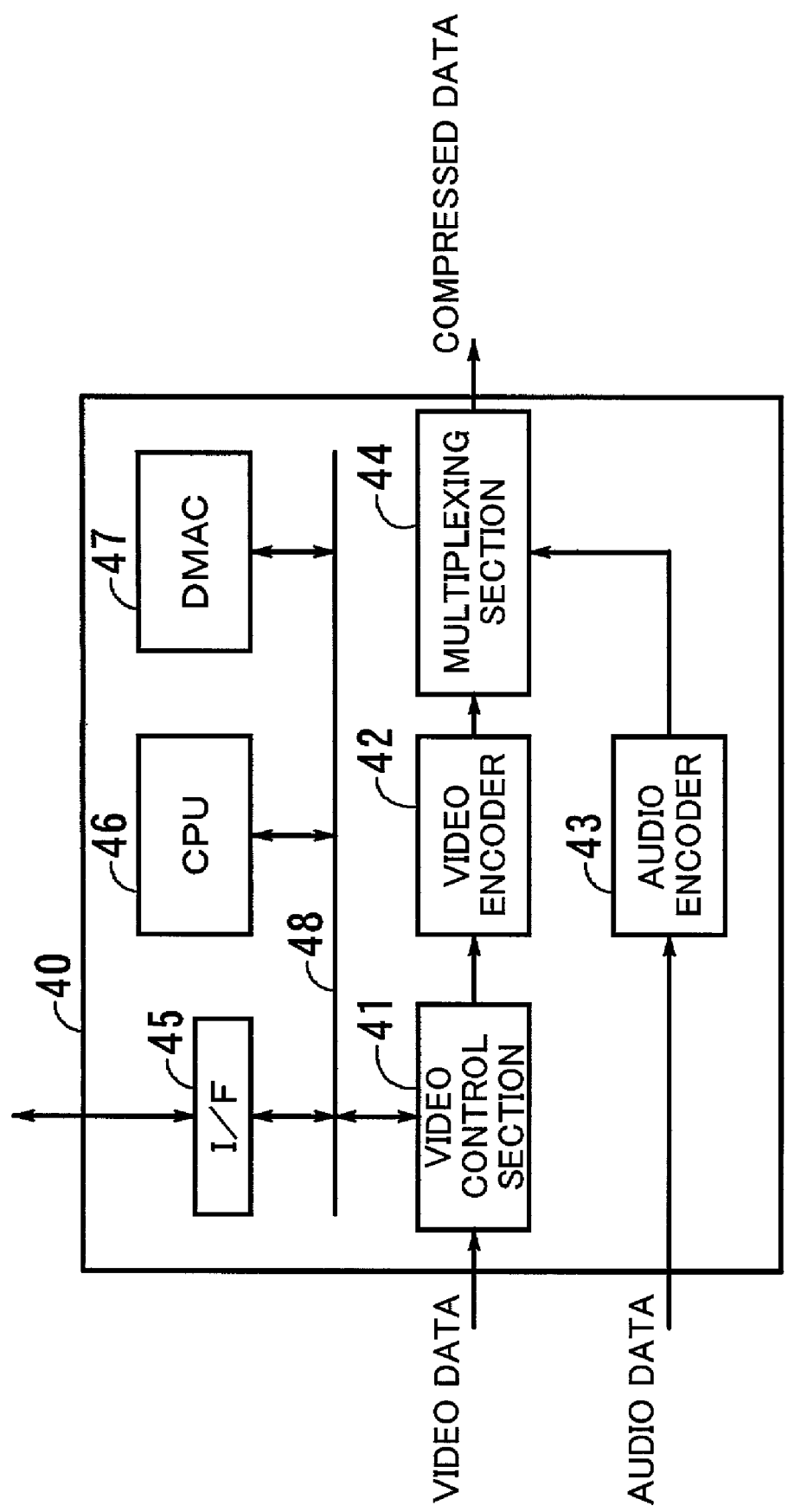
FIG. 3 is a diagram showing in detail an exemplary configuration of an MPEG2 encoder appearing in FIG. 2.

FIG. 3 shows in detail an exemplary configuration of the MPEG2 encoder 40 appearing in FIG. 2. As shown in the figure, the MPEG2 encoder 40 comprises a video control section 41, a video encoder 42, an audio encoder 43, a multiplexing section 44, an I/F 45, a CPU 46, a DMAC (Direct Memory Access Controller) 47, and a bus 48.

The video control section 41 stores the video data supplied from the NTSC decoder 10 temporarily in the SDRAM 21, then successively acquires the stored video data in accordance with the progress of a compression process performed by the video encoder 42, and supplies the acquired data to the video encoder 42.

The video encoder 42 encodes the video data supplied from the video control section 41 to convert same into data of MPEG2 Video MP@ML format, and outputs the converted data.

The audio encoder 43 encodes the audio data supplied from the audio A/D converter 12 to convert same into data of MPEG1 Audio Layer 2 format, and outputs the converted data.

The multiplexing section 44 multiplexes the video data supplied from the video encoder 42 and the audio data supplied from the audio encoder 43, to generate a data stream of MPEG2 PS format, which is then output via the bus 22.

The I/F 45 is an interface which mainly takes care of exchanging data with the SDRAM 21.

The CPU 46 controls the individual parts of the MPEG2 encoder 40 in accordance with firmware stored in the SDRAM 21.

The DMAC 47 exchanges data directly with the SDRAM 21 etc. without through the agency of the CPU 46.

Operation of the embodiment of the present invention will be now described.

When power supply to the recorder is started, first, the CPU 19 acquires the firmware for the MPEG2 encoder 40 stored in the flash ROM 20, and stores the firmware in a predetermined region of the SDRAM 21.

The CPU 46 of the MPEG2 encoder 40 operates in accordance with the firmware thus stored in the SDRAM 21.

Picture recording operation will be now described.

After completion of the initialization described above, video and audio signals are supplied to the NTSC decoder 10 and the audio A/D converter 12, respectively, whereupon the NTSC decoder 10 converts the video signal into video data of ITU-R656 format and outputs the converted data, while the audio A/D converter 12 converts the audio signal into audio data of I2S format and outputs the converted data.

In accordance with instructions from the CPU 19, the video control section 41 of the MPEG2 encoder 40 successively stores the input video data in the SDRAM 21 via the I/F 45.

The CPU 46 acquires the video data stored in the SDRAM 21 and detects copy protection information inserted in the VBI of the video data.

Figure 4:
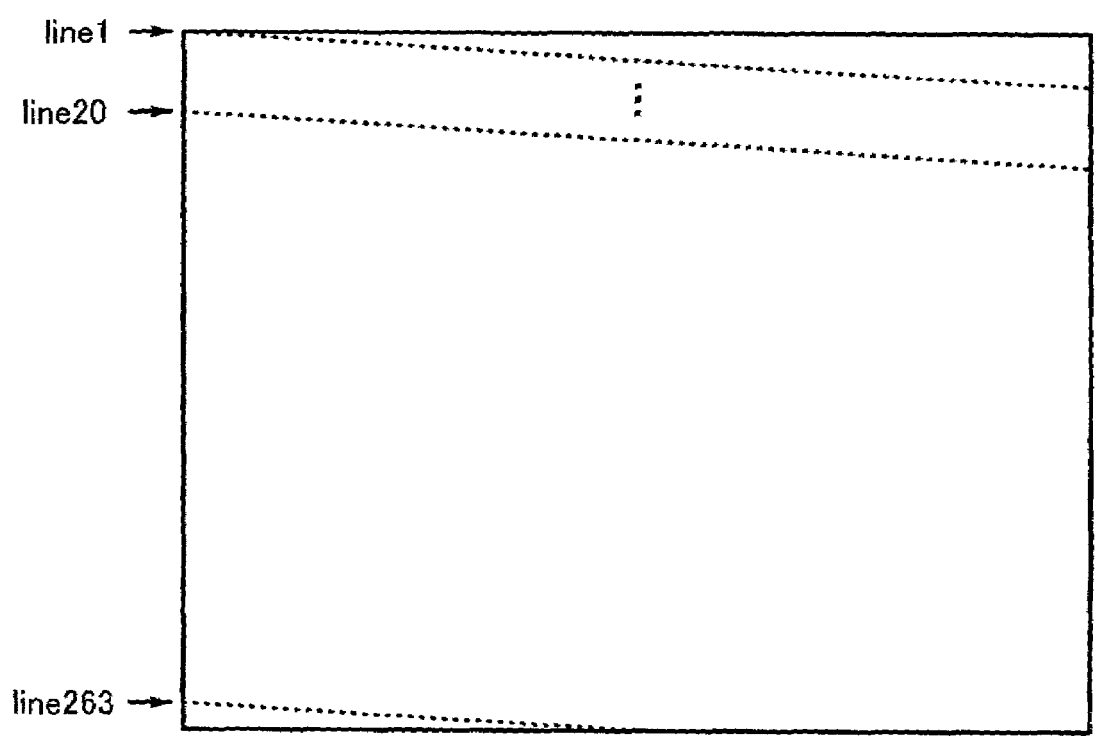
FIG. 4 is a diagram illustrating details of a VBI.
Figure 5:
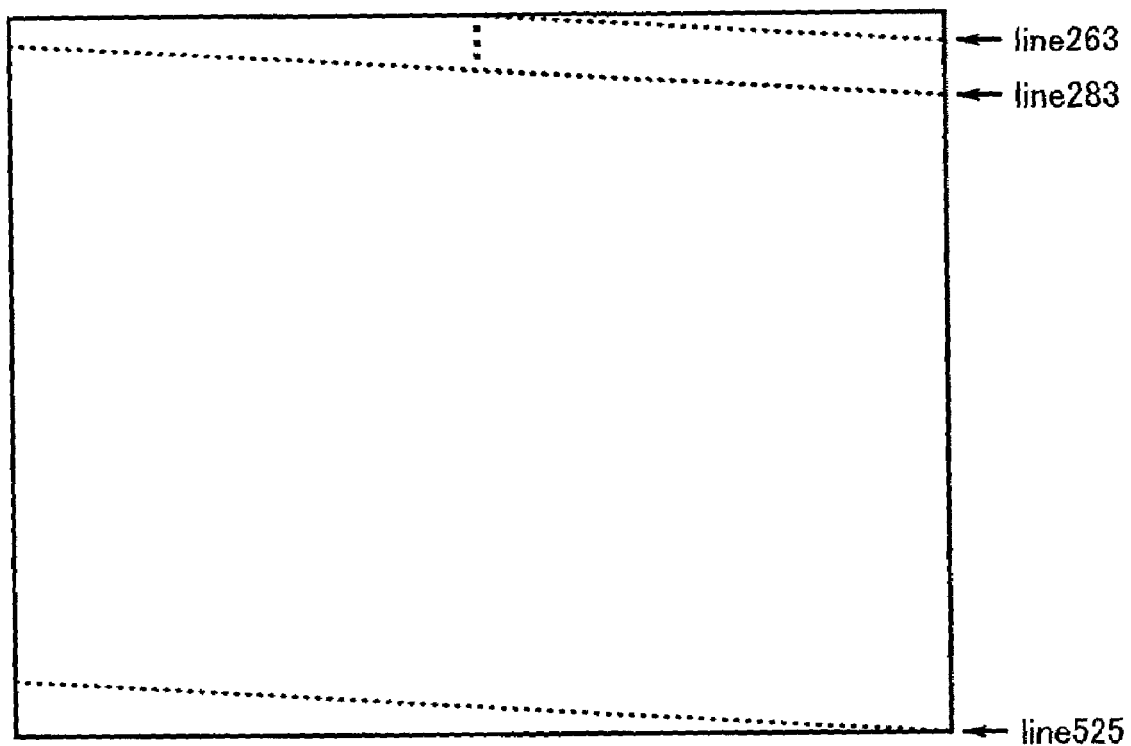
FIG. 5 is a diagram also illustrating details of the VBI.

The VBI corresponds to a region of lines 10 to 20 of the top field, as shown in FIG. 4, and to a region from the latter half of line 272 to the former half of line 283 of the bottom field, as shown in FIG. 5. These regions, except for the interval used for synchronization, permit the insertion of information such as teletext.

FIG. 6 illustrates an example of copy protection information. As shown in the figure, the copy protection information is represented by bit A and bit B. If bits A and B are both "0", this combination indicates "copy permitted". If bit A is "0" and bit B is "1", the combination indicates "undefined", and if bit A is "1" and bit B is "0", the combination indicates "one copy permitted". If bits A and B are both "1", the combination indicates "copy not permitted".

The CPU 46 writes the detected copy protection information or information relating thereto into a predetermined region of the SDRAM 21, and generates an interrupt to notify the CPU 19 of the information. A process relating to the copy protection information will be described later.

The video data with respect to which the copy protection information has been detected by the CPU 46 is supplied to the video encoder 42 via the video control section 41.

The video encoder 42 encodes the video data to convert same into data of MPEG2 Video MP@ML format, and outputs the converted data.

The audio encoder 43 encodes the audio data supplied from the audio A/D converter 12 to convert same into data of MPEG1 Audio Layer 2 format, and outputs the converted data.

The multiplexing section 44 multiplexes the video data supplied from the video encoder 42 and the audio data supplied from the audio encoder 43 to generate a data stream of MPEG2 PS format, and outputs the data stream via the bus 22.

The data stream output from the MPEG2 encoder 40 in this manner is written into a predetermined region of the HDD 15 via the IDE I/F 14.

The process relating to the copy protection information will be now described.

As mentioned above, on detecting the copy protection information, the CPU 46 stores the information in a predetermined region of the SDRAM 21 and also generates an interrupt with respect to the CPU 19 to notify the CPU 19 of the detected protection information.

FIG. 7 illustrates an example of information (hereinafter referred to as notification data) written into the SDRAM 21. As shown in the figure, the notification data is constituted by three pieces of information, that is, copy restriction signal information notification command, state notification code, and state of copy protection signal, each consisting of 8 bits.

The copy restriction signal information notification command is a command indicating notification of copy restriction signal information, and is represented by "0x02".

The state notification code is a code indicating notification of state and is represented by "0x00".

The state of copy protection signal corresponds to bits A and B shown in FIG. 6: "0x00" indicates "copy permitted" and "0x02" indicates "one copy permitted".

When "0x03" corresponding to "copy not permitted" is detected from the VBI, for example, the CPU 46 writes "0x1000003" into a predetermined region of the SDRAM 21 and generates an interrupt with respect to the CPU 19.

As a consequence, the CPU 19 reads out "0x1000003" from the predetermined region of the SDRAM 21, analyzes this notification data, and recognizes that "copy not permitted" has been detected.

Similarly, when "copy not permitted" is again detected from the VBI, the CPU 46 writes "01x000003" into the SDRAM 21 and generates an interrupt, as in the aforementioned case.

The CPU 19 reads out and analyzes the notification data written in the SDRAM 21, and increments the count of a counter if the notified state is the same as the previous one. In the above example, "copy not permitted" has been detected again, and accordingly, the CPU 19 increments the count of the counter.

The aforementioned operation is repeated, and if the count of the counter reaches "10", the CPU 19 requests the MPEG2 encoder 40 to stop the encoding process, and also requests same to supply specification information specifying a time point at which "copy not permitted" was detected for the first time.

As a consequence, the video control section 41 of the MPEG2 encoder 40 stops supplying the video data to the video encoder 42, stores specification information specifying the time point at which "copy not permitted" was detected first, into a predetermined region of the SDRAM 21, and generates an interrupt.

FIG. 8 illustrates an example of specification information stored in the SDRAM 21 at this time. In the illustrated example, the specification information is constituted by copy restriction signal information notification command, position information notification code, byte length of target position information value, and target position information.

The copy restriction signal information notification command is represented by "0x10" and indicates that the information concerned is the copy restriction signal information.

The position information notification code is represented by "0x01" and indicates that the information concerned notifies position information.

The byte length of target position information value represents the byte length of expression of target position information indicating a position where target copy protection information exists.

The target position information indicates the number of bytes as counted from the head of the stream where the head of a PS packet including the head of a field with respect to which "copy not permitted" was detected first, or the head of the target field, exists.

The target position information may be information indicating the number of bytes as counted from the stream head where the tail position of a field immediately preceding that with respect to which "copy not permitted" was detected first, or the tail position of a PS packet including the tail position of the immediately preceding field, exists.

Also, the target position information may be generated using GOP (Group of Pictures), to indicate the number of bytes as counted from the stream head where the head position of a GOP including the field with respect to which "copy not permitted" was detected first, or the head position of a PS packet including the head position of the GOP, exists.

Further, the target position information may be information indicating the number of bytes as counted from the stream head where the tail position of a field immediately preceding that with respect to which "copy not permitted" was detected first, or the tail position of a GOP including the tail position of the immediately preceding field, exists.

For example, in the case where the target position is at 100 Mbytes from the stream head, 100 M=0x5F5E100 and the number of bytes of the target position information value=0x04; accordingly, "0x10010405F5E100" is written into the SDRAM 21.

The CPU 19 detects the generation of the interrupt and thus reads out the specification information from the SDRAM 21. The CPU 19 then extracts the target position information, and supplies the extracted information to the IDE I/F 14 to request same to delete the corresponding part.

As mentioned above, the target position information indicates the number of bytes as counted from the stream head where the head of the PS packet including the field with respect to which "copy not permitted" was detected for the first time exists, and accordingly, the IDE I/F 14 deletes the unnecessary part (from the position where "copy not permitted" is detected first to the end) of the data already written into the HDD 15.

Consequently, among the data recorded in the HDD 15, a part which is prohibited from being copied can be deleted afterward.

Processes performed in the above embodiment will be now described with reference to FIGS. 9 through 11.

Figure 9:
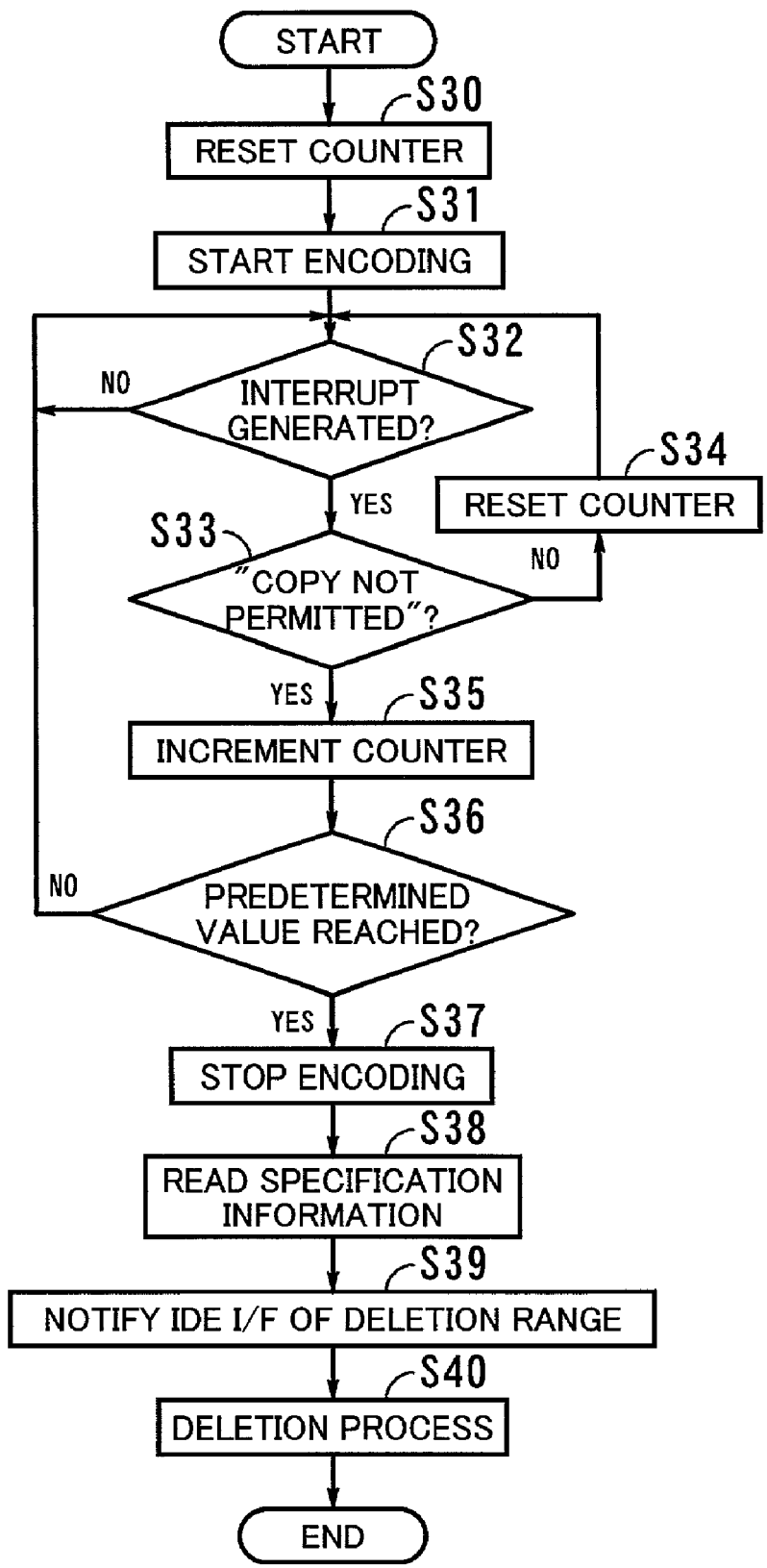
FIG. 9 is a flowchart illustrating an example of process executed by a CPU.

FIG. 9 is a flowchart illustrating an example of process executed by the CPU 19. Upon start of the process shown in the flowchart, the following steps are executed.

Step S30:
The CPU 19 resets the counter which counts the number of times "copy not permitted" is detected.

Step S31:
The CPU 19 supplies an encode start command to the MPEG2 encoder 40 to cause same to start encoding.

Step S32:
The CPU 19 determines whether or not an interrupt has been generated by the MPEG2 encoder 40. If an interrupt has been generated, the flow proceeds to Step S33; if not, Step S32 is repeated.

Step S33:
The CPU 19 reads out the notification data stored in the SDRAM 21 and determines whether or not "copy not permitted" has been detected. If "copy not permitted" has been detected, the flow proceeds to Step S35; otherwise the flow proceeds to Step S34.

Step S34:
The CPU 19 resets the counter, whereupon the flow returns to Step S32 to repeat same.

Step S35:
The CPU 19 increments the counter by "1".

Step S36:
The CPU 19 determines whether or not the value of the counter has reached a predetermined value (e.g., "10"). If the predetermined value is reached, the flow proceeds to Step S37; if not, the flow returns to Step S32 to repeat same.

Step S37:
The CPU 19 supplies an encode stop command to the MPEG2 encoder 40 to cause same to stop encoding.

Step S38:
The CPU 19 reads out the specification information written into the SDRAM 21 by the MPEG2 encoder 40.

Step S39:
The CPU 19 extracts the target position information from the specification information to specify the position of data to be deleted, and notifies the IDE I/F 14 of the specified position.

Step S40:
The CPU 19 instructs the IDE I/F 14 to delete the specified data.

Figure 10:
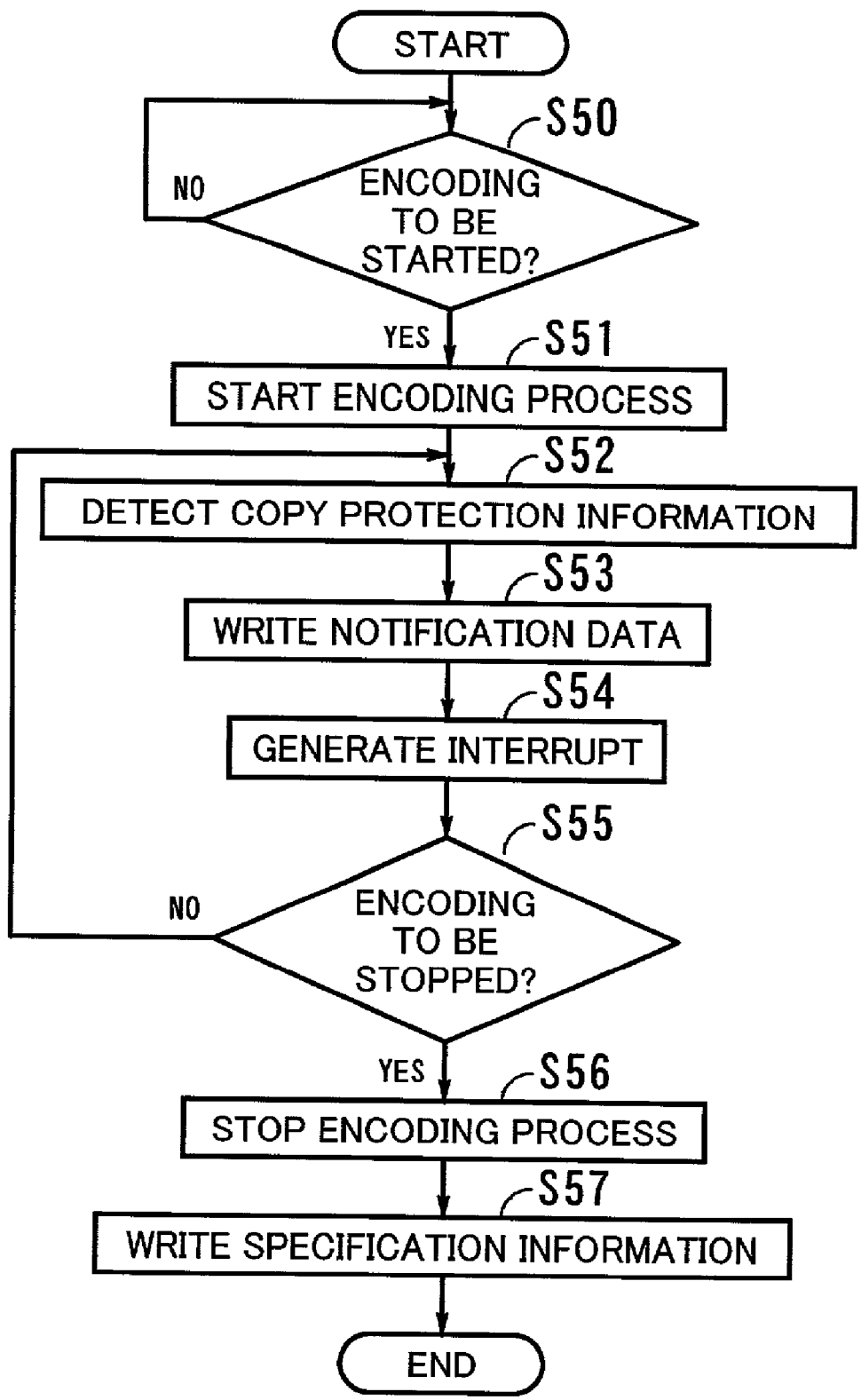
FIG. 10 is a flowchart illustrating an example of process executed by the MPEG2 encoder.

Referring now to FIG. 10, a process executed by the CPU 46 of the MPEG2 encoder 40 will be described. Upon start of the process shown in the flowchart, the following steps are executed.

Step S50:
The CPU 46 determines whether or not an encode start command to start encoding has been received from the CPU 19. If an encode start command has been received, the flow proceeds to Step S51; if not, Step S50 is repeated.

Step S51:
The CPU 46 sends a control signal to the video control section 41 to cause same to start an encoding process.

Step S52:
The CPU 46 detects the copy protection information inserted in the VBI of the video data read from the SDRAM 21.

Step S53:
The CPU 46 writes notification data, such as one shown in FIG. 7, into a predetermined region of the SDRAM 21.

Step S54:
The CPU 46 generates an interrupt with respect to the CPU 19.

Step S55:
The CPU 46 determines whether or not an encode stop command to stop encoding has been received from the CPU 19. If an encode stop command has been received, the flow proceeds to Step S56; if not, the flow returns to Step S52 to repeat same.

Step S56:
The CPU 46 supplies a control signal to the video control section 41 to cause same to stop the encoding process.

Step S57:
The CPU 46 writes specification information, such as one shown in FIG. 8, into a predetermined region of the SDRAM 21, whereupon the process is ended.

Figure 11:
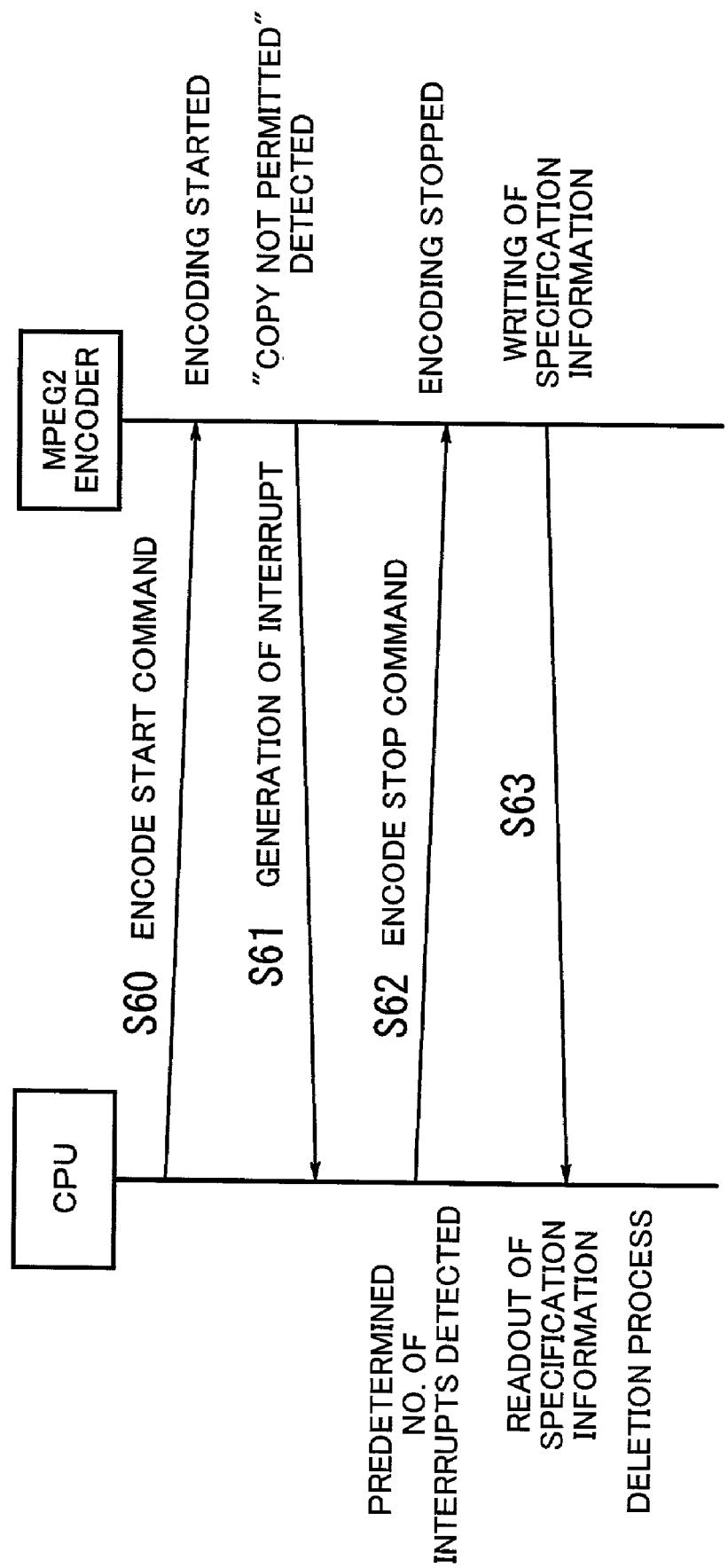
FIG. 11 is a chart showing examples of commands exchanged between the CPU and the MPEG2 encoder.

FIG. 11 illustrates the manner of how commands are exchanged between the CPU 19 and the MPEG2 encoder 40. In the following description, reference is made to this figure.

First, the encode start command is sent from the CPU 19 to the MPEG2 encoder 40 (Step S60), whereupon the MPEG2 encoder 40 performs the encoding process.

Subsequently, if "copy not permitted" is detected as the copy protection information, the MPEG2 encoder 40 generates an interrupt with respect to the CPU 19 (Step S61).

If, as a result, the interrupt attributable to "copy not permitted" is generated the predetermined number of times, the CPU 19 supplies the encode stop command to the MPEG2 encoder 40 (Step S62). On receiving the encode stop command, the MPEG2 encoder 40 stops the encoding process.

Subsequently, the MPEG2 encoder 40 writes the specification information into a predetermined region of the SDRAM 21 (Step S63). As a consequence, the CPU 19 reads out the specification information from the SDRAM 21 and requests the IDE I/F 14 to delete the range of data specified by the specification information.

The process described above permits data already stored in the HDD 15 to be deleted afterward while at the same time specifying a range to be deleted, as mentioned above.

In the above embodiment, the encoding process is stopped when "copy not permitted" has been detected a plurality of times. In cases where the influence of noise is small, the encoding process may be stopped at the time when "copy not permitted" is detected once.

Also, in the embodiment, when "copy not permitted" has been detected a plurality of times, information specifying the part with respect to which "copy not permitted" was detected first is output, but information specifying some other part than the head may alternatively be output.

Further, in the foregoing embodiment, an interrupt is generated each time "copy not permitted" is detected, and when "copy not permitted" has been detected a predetermined number of times, the CPU 19 judges that the encoding should be stopped. The MPEG2 encoder 40 may alternatively count the number of times "copy not permitted" is detected, and when the count has reached a predetermined number, the MPEG2 encoder 40 may stop the encoding process by itself and supply the specification information to the CPU 19.

In the above embodiment, moreover, the encoding is stopped when "copy not permitted" has been detected consecutively a plurality of times. Alternatively, the encoding process may be stopped when, for example, among a plurality of times the detection is performed, "copy not permitted" is detected a predetermined number of times or more (e.g., "copy not permitted" is detected eight times or more out of ten times of detection).

The foregoing description of the embodiment is directed only to the case where "copy not permitted" is detected.

Where "one copy permitted" is detected, "copy not permitted" may be recorded in place of "one copy permitted" when picture is recorded for the first time, for example, whereby copying is prohibited thereafter by the same process as described above.

Further, MPEG2 encoder is taken as a example in the above description of the embodiment, but the present invention is of course not limited to such application alone.

As described above, according to the present invention, a semiconductor device for compressing picture signal comprises input portion for receiving an input picture signal, copy protection information detecting portion for detecting copy protection information included in the picture signal input from the input portion, compressing portion for compressing the picture signal, and compressed data output portion for outputting compressed data obtained by the compressing portion, whereby illegal copying can be effectively prevented.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A method comprising:
   receiving a picture signal;
   detecting copy protection information included in the received picture signal;
   compressing the received picture signal;
   outputting the compressed picture signal;
   outputting specification information indicating for which part of the compressed picture signal the detected copy protection information takes effect on, as determined from a head position where the copy protection information is first detected, the copy protection information indicating copying is prohibited; and
   specifying and deleting, based on the specification information, a part of the compressed data that has been recorded on a storage unit even though copying is prohibited, after detecting more than one time that the copy protection information indicates that copying is prohibited.

2. A method of deleting portions of compressed data, comprising:
   outputting specification information indicating which part of the compressed data includes copy protection information, as determined from a head position in a storage unit where the copy protection information is detected; and
   specifying and deleting, based on the specification information, at least a part of the compressed data after confirming more than one time that the copy protection information indicates that copying is prohibited.

3. A semiconductor device for compressing picture signal, comprising:
   an input portion for receiving a picture signal;
   a copy protection information detecting portion for detecting copy protection information included in the picture signal input from the input portion;
   a compressing portion for compressing the picture signal;
   a compressed data output portion for outputting compressed data obtained by the compressing portion;
   a specification information output portion, coupled to said copy protection information detecting portion and compressing portion, for outputting specification information indicating which part of the compressed data the detected copy protection information takes effect on, as determined from a head position where the copy protection information is first detected, the copy protection information indicating copying is prohibited; and
   a data deletion portion, which specifies and deletes, based on the specification information, a part of the compressed data that has been recorded on a storage unit even though copying is prohibited when the copy protection information detecting portion detects more than one time that the copy protection information indicating copying is prohibited.

4. The semiconductor device according to claim 3 wherein, when the copy protection information has been detected a plurality of times by the copy protection information detecting portion, the specification information output portion outputs information specifying at least one of a set of copy protection information detected the plurality of times.

5. The semiconductor device according to claim 3 wherein the specification information indicates an amount of data from a head of the compressed data to the corresponding part of same, to thereby specify a position where the copy protection information has been detected.

6. The semiconductor device according to claim 3, further comprising compressing operation stopping portion for stopping compressing operation of the compressing portion when the copy protection information has been detected a predetermined number of times by the copy protection information detecting portion.

7. An apparatus comprising:
   means for receiving a picture signal;
   means for detecting copy protection information included in the received picture signal;
   means for compressing the received picture signal;
   means for outputting the compressed picture signal;
   means for outputting specification information indicating for which part of the compressed picture signal the detected copy protection information takes effect on, as determined from a head position of the part where the copy protection information is first detected, the copy protection information indicating copying is prohibited; and
   means for specifying and deleting, based on the specification information, a part of the compressed data that has been recorded on a storage unit even though copying is prohibited when the means for detecting copy protection information detects more than one time that copying is prohibited according to the copy protection information.

* * * * *